United States Patent [15] 3,673,266
Fanta et al. [45] June 27, 1972

[54] PROCESS FOR PREPARING DIHYDRO-β-SANTALOL FROM 3-ENDO-METHYL-3-EXO(4'-METHYL-5'-HYDROXYPENTYL)NORCAMPHOR

[72] Inventors: Wayne I. Fanta, Colerain Township, Hamilton County; William F. Erman, Springfield Township, Hamilton County, both of Ohio

[73] Assignee: The Procter and Gamble Company, Cincinnati, Ohio

[22] Filed: Aug. 20, 1968

[21] Appl. No.: 753,897

[52] U.S. Cl..........................260/631.5, 260/488 B, 260/491, 260/587
[51] Int. Cl. .......................C07c 35/22, C11d 3/50
[58] Field of Search .................260/631.5, 617 F, 488 B, 491

[56] References Cited

UNITED STATES PATENTS

| | | | |
|---|---|---|---|
| 3,373,211 | 3/1968 | Witts et al. | 260/643 F |
| 2,817,677 | 12/1957 | Subluskey | 260/488 B |
| 3,408,388 | 10/1968 | Hagemeyer et al. | 260/491 |
| 3,510,510 | 5/1970 | Kropp | 260/631.5 |

FOREIGN PATENTS OR APPLICATIONS 210,574   8/1960   Austria..............................260/631.5

OTHER PUBLICATIONS

Kompps; " Berichte der Deutschen Chemischen Gesellschaft," (1944), pp. 1– 13
Wagner, et al., " Synthetic Organic Chemistry," (1953), pg. 32, QO262W24
Kharasch et al., " Grynard Reactions of Nonmetallic Substances," (1954), pp. 3, 16, 17, 22– 25, 143– 146, 322 QD77K46

*Primary Examiner*—Leon Zitver
*Assistant Examiner*—Joseph E. Evans
*Attorney*—Julius P. Filck and Richard C. Witte

[57] ABSTRACT

A process for preparing dihydro-β-santalol from 3-endo-methyl-3-exo(4'-methyl-5'-hydroxpentyl)norcamphor comprising the steps of (1) reacting 3-endo-methyl-3-exo(4'-methyl-5'-hydroxypentyl)norcamphor with an organometallic compound and, subsequently, hydrolyzing the reaction product with water to obtain a diol: (2) esterifying the primary alcohol of the diol reaction product of Step (1) to obtain a hydroxy ester; (3) dehydrating the hydroxy ester of Step (2) to obtain the ester of dihydro-β-santalol; and (4) saponifying the ester of di-hydro-β-santalol of Step (3) to obtain dihydro-β-santalol is disclosed. Dihydro-β-santalol is useful as a perfume component.

12 Claims, No Drawings

PROCESS FOR PREPARING DIHYDRO-β-SANTALOL FROM 3-ENDO-METHYL-3-EXO(4'-METHYL-5'-HYDROXYPENTYL)NORCAMPHOR

FIELD OF THE INVENTION

This invention relates to a process for preparing dihydro-β-santalol, a compound having a valuable sandalwood odor useful in perfume compositions, from 3-endo-methyl-3-exo(4'-methyl-5'-hydroxypentyl)norcamphor. More specifically, this process relates to the preparation of dihydro-β-santalol by reacting 3-endo-methyl-3-exo(4'-methyl-5'-hydroxypentyl)norcamphor with an organometallic compound and, subsequently hydrolyzing the reaction product to obtain the diol, 2-exo-3-endo-dimethyl-3-exo(4'-methyl-5'-hydroxypentyl)norborneol; esterifying the diol to obtain the hydroxy ester of 2-exo-3-endo-dimethyl-3-exo 4'-methyl-5'-hydroxypentyl)norborneol; dehydrating the hydroxy ester with thionyl chloride, phosphorous oxychloride or a Lewis acid to obtain the ester of dihydro-β-santalol; and saponifying the dehydrated ester with a strong base to obtain dihydro-β-santalol.

HISTORY OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited, and sometimes sporadic, supply. For this reason, a continuous effort has been made to synthesize various components of sandalwood oil or similar synthetic materials which possess the desirable woody fragrance of sandalwood oil.

The process presented herein for preparing dihydro-β-santalol from 3-endo-methyl-3-exo(4'-methyl-5'-hydroxypentyl)-norcamphor represents a portion of an extensive scientific effort to obtain dihydro-β-santalol, a valuable synthetic sandalwood perfume. Other processes and intermediate compounds relating to the synthesis of dihydro-β-santalol are described in the following copending U.S. patent applications: Fanta and Erman, 3-endo-Methyl-3-exo(4'-methyl-5'-hydroxypentyl)norcamphor and 2-Methyl-5-bromopentanol, and Process for the Preparation of These Compounds, Ser. No. 717,360, filed Mar. 29, 1968 now U.S. Pat. No. 3,579,479; Fanta and Erman, Tetrahydropyranyl Ether Compounds and Process for the Preparation of These Compounds and 3-endo-Methyl-3-exo(4'-methyl-5'-hydroxypentyl)norcamphor, Ser. No. 717,384, filed Mar. 29, 1968 now abandoned; Fanta and Erman, Preparation of 3-endo-Methyl-3-exo(4'-methyl-5'-hydroxypentyl)norcamphor from 2-Methyl-4-pentenol, Ser. No. 717,362, filed Mar. 29, 1968 now U.S. Pat. No. 3,580,953; Fanta and Erman, Preparation of 3-endo-Methyl-3-exo(4'-methyl-5'-hydroxypentyl)norcamphor from 2-Methyl-4-pentenol, Ser. No. 717,374, filed Mar. 29, 1968 now U.S. Pat. 3,580,954; Fanta and Erman, Dihydro-β-santalol and Process for Preparing Dihydro-β-santalol from 3-endo-Methyl-3-exo(4'-methyl-5'-hydroxypentyl)norcamphor, Ser. No. 717,458, filed Mar. 29, 1968; Kretschmar, Fanta and Erman, Process for Preparing 3-endo-Methylnorcamphor from 2-Methylnorborn-2-ene, Ser. No. 731,653, filed May 23, 1968; and Gibson, Kretschmar and Erman, Process for Preparing 3-Methylnorcamphor from 2-Methylnorborn-2-ene, Ser. No. 731,652, filed May 23, 1968.

SUMMARY OF THE INVENTION

The process of this invention comprises the steps of
1. reacting 3-endo-methyl-3-exo(4'-methyl-5'-hydroxypentyl)norcamphor having the structural formula

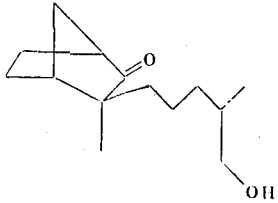

with an organometallic compound selected from the group consisting of methylmagnesium bromide, methylmagnesium iodide, methylmagnesium chloride, methyllithium, methylsodium and methylpotassium and, subsequently, hydrolyzing the reaction product to obtain 2-exo-3-endo-dimethyl-3-exo(4'-methyl-5'-hydroxypentyl)norborneol having the structural formula

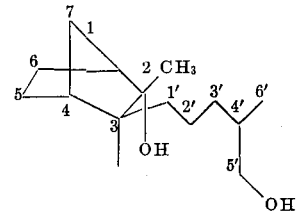

2. esterifying 2-exo-3-endo-dimethyl-3-exo(4'-methyl-5'-hydroxypentyl)norborneol, the hydrolyzed reaction product of Step (1), with an esterifying agent to obtain the hydroxy ester of 2-exo-3-endo-dimethyl-3-exo(4'-methyl-5'-hydroxypentyl)-norborneol having the structural formula

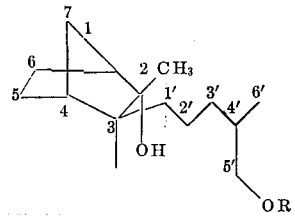

wherein R is an acyl group containing from two to about eight carbon atoms;

3. dehydrating the hydroxy ester of Step (2) with a compound selected from the group consisting of thionyl chloride, phosphorous oxychloride, and Lewis acids to obtain the ester of dihydro-β-santalol having the structural formula

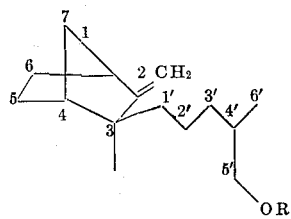

wherein R is as hereinbefore defined; and 4. saponifying the ester of dihydro-β-santalol obtained from Step (3) with a strong base to obtain dihydro-β-santalol having the structural formula

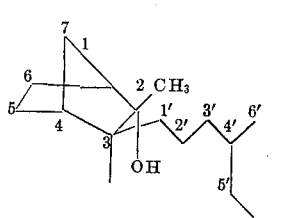

Dihydro-β-santalol, the product of this process, possesses a desirable, woody sandalwood fragrance, and, thus, has utility as a perfume component.

DESCRIPTION OF THE PROCESS FOR PREPARING DIHYDRO-β-SANTALOL

The initial starting compound, 3-endo-methyl-3-exo(4'-methyl-5'-hydroxypentyl)norcamphor, and processes for preparing this compound are described in the aforementioned abandoned application and U.S. Pat. Nos. 3,579,479, 3,580,953 and 3,580,954.

STEP (1)

The first step of this invention comprises reacting 3-endo-methyl-3-exo(4'-methyl-5'-hydroxypentyl)norcamphor with an organometallic compound and, subsequently, hydrolyzing the reaction product to obtain 2-exo-3-endo-dimethyl-3-exo(4'-methyl-5'-hydroxypentyl)norborneol having the structural formula

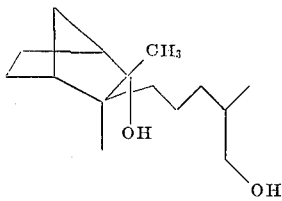

The organometallic compounds suitable for use in Step (1) are selected from the group consisting of the methyl Grignards e.g., methylmagnesium bromide, methylmagnesium iodide, methylmagnesium chloride, and methylmetallic compounds, e.g., methyllithium, methylsodium and methylpotassium. Methylmagnesium bromide, methylmagnesium chloride, and methyllithium are preferred for use herein.

A solvent is generally used in this step of the process to dissolve the organometallic compound and the 3-endo-methyl-3-exo(4'-methyl-5'-hydroxypentyl)norcamphor. Any solvent which will dissolve the reactants but which does not enter into the reaction is suitable for use herein. Solvents which are suitable for use herein include ether solvents such as diethyl ether, tetrahydrofuran, dioxane, 1,2-dimethoxyethane, dibutyl ether, and bis-(2-methoxyethyl)-ether.

In this first step, a reaction mixture is prepared containing 3-endo-methyl-3-exo(4'-methyl-5'-hydroxypentyl)-norcamphor, and an organometallic compound (methyl Grignard or methylmetallic compound), and a solvent. Both the methyl Grignards and the methylmetallic compounds should be used in a molar ratio of organometallic compound to 3-endo-methyl-3-exo(4'-methyl-5'-hydroxypentyl)norcamphor of about 2:1 for all of the norcamphor compound to react (e.g., 1 mole of organometallic is needed to react at the hydroxyl site and a second mole of organometallic is needed to react at the carbonyl site). In most cases, however, the organometallic compounds are used in a molar excess of the about 2:1 ratio. Methyl Grignard is used in a molar ratio of from about 2:1 to about 6:1 to 3-endo-methyl-3-exo(4'-methyl-5'-hydroxypentyl)-norcamphor while the methylmetallic compound is used in a molar ratio of from about 2:1 to about 5:1 to 3-endo-methyl-3-exo(4'-methyl-5'-hydroxypentyl)norcamphor.

The molar excess of the organometallic compound used is dependent to some extent on the solvent employed. In the reaction of 3-endo-methyl-3-exo(4'-methyl-5'-hydroxypentyl)norcamphor with the organometallic compound, an intermediate, an organometallic salt of the following formula

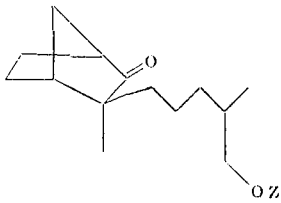

wherein Z is selected from the group consisting of Na, K, Li, MgBr, MgI, and MgCl, is formed due to the preferential reaction of the primary hydroxyl with the organometallic compound. The excess organometallic compound subsequently reacts with the carbonyl group to form the diol hereinbefore described. Where the intermediate, the organometallic salt, is only slightly soluble in the solvent employed, a large excess of the organometallic compound is generally used. Conversely, as the solubility of the intermediate organometallic salt increases in the solvent, the amount of the organometallic compound in excess is generally reduced.

The solvent, as described above, is used in such amounts as is necessary to dissolve the organometallic compound as well as the 3-endo-methyl-3-exo(4'-methyl-5'-hydroxypentyl)norcamphor. The solvent is generally used in a weight ratio of solvent to 3-endo-methyl-3-exo(4'-methyl-5'-hydroxypentyl)norcamphor of from about 5:1 to about 40:1, preferably from about 20:1 to about 30:1. The solvent can be used in larger quantities than those designated above; however, no advantage is gained.

The reaction mixture comprising 3-endo-methyl-3-exo(4'-methyl-5'-hydroxypentyl)norcamphor, organometallic compound and solvent is allowed to react for from about 1 to about 24 hours. If a methyl Grignard reagent is the organometallic compound used, the reaction mixture is generally maintained at elevated temperatures, e.g., from 40° to 100° C., for from about 4 to 6 hours. If a methylmetallic compound is used, the reaction will proceed at room temperature in from about 2 to about 4 hours. The reaction time, of course, is influenced by the reaction conditions, the solvents used, the specific organometallic compound used, the molar ratios of the reactants and the temperatures used.

Although this reaction will proceed in air, it is preferred in this step of the reaction to utilize an inert reaction atmosphere. The inert atmosphere can be comprised of nitrogen, argon or any gas which is essentially free of oxygen and does not react with the above-described reactants.

The reaction is allowed to proceed until both reactive sites of 3-endo-methyl-3-exo(4'-methyl-5'-hydroxypentyl)norcamphor, i.e., the carbonyl and hydroxyl sites, have reacted. The optimum reaction time for particular components, concentrations and reaction conditions can be determined easily by pouring a portion of the reaction mixture into water at a predetermined point in time and then using infrared spectroscopy techniques to determine whether diol formation is completed. Several short experiments can be run to determine the optimum reaction times. The reaction product obtained before hydrolysis has the following formula

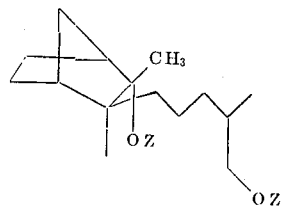

wherein Z is selected from the group consisting of Na, K, Li, MgCl, MgBr and MgI.

When the above reaction has gone to completion, the reaction product above is hydrolyzed to the diol, 2-exo-3-endo-dimethyl-3-exo(4'-methyl-5'-hydroxypentyl)norborneol, having the formula

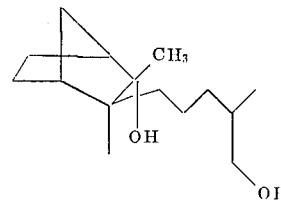

Where small amounts of reaction product are desired hydrolysis to the diol is accomplished preferably by pouring the reaction mixture into an excess of water, preferably cold water or ice. The reaction product above-described is, thus, hydrolyzed and the diol and alkali metal hydroxides or magnesium halohydroxides are obtained. The diol is slightly soluble in water; therefore, to prevent loss of the diol, it is desirable that the water be saturated with, for example, sodium sulfate or sodium chloride. The solvent layer (generally ether) which contains the diol is then removed. The water layer can be successively extracted one or more times with additional solvent to improve the yield of product in this reaction. Any water remaining in the organic layer can be removed in any convenient manner, for example, with anhydrous magnesium sulfate. The crude diol is obtained by removing the solvent, e.g., by distillation. This crude diol can be utilized in Step (2) of this process or it can be purified further by distillation after solvent removal.

Where larger amounts of reaction product are desired hydrolysis to the diol is preferably accomplished by the gradual addition to the reaction mixture of a saturated aqueous solution of, for example, sodium sulfate or sodium chloride. The solvent layer containing the diol separates from the pasty inorganic salts formed and is drawn off. The inorganic salts are then washed several times, generally by stirring with ether, to recover all of the diol. These washes are combined with the original solvent layer and any excess water is removed using a standard drying agent. The crude diol can be obtained by distilling off the solvent.

In a preferred embodiment, sodium hydride or sodium metal can be substituted for a portion of the organometallic compound to lower the cost of this process. The solvents described hereinbefore are suitable for use in this preferred embodiment. Sodium metal or sodium hydride, when allowed to react with 3-endo-methyl-3-exo(4'-methyl-5'-hydroxypentyl)norcamphor at temperatures ranging from 15° to 120° C. for from about 1 to about 6 hours, forms the primary sodium salts at the reactive hydroxyl site but does not react appreciably at the carbonyl site. Thus, in this preferred embodiment, the organometallic compound can effectively reduce the carbonyl site to a hydroxyl moiety without first reacting with the primary hydroxyl present. From about 0.9 to about 1.1 moles of sodium metal or sodium hydride are generally used per mole of 3-endo-methyl-3-exo(4'-methyl-5'-hydroxypentyl)norcamphor before the organometallic compounds are added to the reaction mixture. In this preferred embodiment, the number of moles of organometallic compound used can be decreased from that previously described by the number of moles of sodium metal or sodium hydride used herein per mole of 3-endo-methyl-3-exo(4'-methyl-5'-hydroxypentyl)norcamphor.

STEP (2)

The second step of this process comprises esterifying the primary hydroxyl of 2-exo-3-endo-dimethyl-3-exo(4'-methyl-5'-hydroxypentyl)norborneol to obtain the hydroxy ester of 2-exo-3-endo-dimethyl-3-exo(4'-methyl-5'-hydroxypentyl)norborneol having the formula

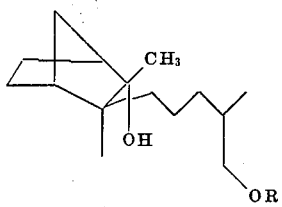

wherein R is an acyl group containing from two to about eight carbon atoms. General methods of esterifying alcohols are well known and are described in Cram and Hammond, Organic Chemistry, (McGraw-Hill, 2nd Ed., 1964) at pages 92–94 and 358–360 (these pages are incorporated herein by reference). These methods include use of esterifying agents such as acids, acid halides and acid anhydrides. In the process of this invention, the acyl chains of these compounds should contain from two to about eight carbon atoms. A preferred method of forming the hydroxy ester of the diol, 2-exo-3-endo-dimethyl-3-exo(4'-methyl-5'-hydroxypentyl)-norborneol, comprises dissolving the diol in a solvent and adding acetic anhydride thereto. The acetic anhydride is used in this step in a molar ratio of diol to acetic anhydride of from about 1:1 to about 1:5 with about 1:3 being preferred. Other specific compounds meeting the above definition can be used herein in the amounts specified for acetic anhydride and include the following alkanoyl halides and anhydrides: acetyl bromide, acetyl chloride, propionyl bromide, propionyl chloride, valeryl bromide, butyryl chloride, propionic anhydride, acetic propionic anhydride, butanoic anhydride, and acetic butanoic anhydride. The following alkanoic acids can be utilized herein to obtain the hydroxy ester of 2-exo-3-endo-dimethyl-3-exo(4'-methyl-5'-hydroxypentyl)-norborneol, however, yields may be reduced: acetic acid, propionic acid, and butanoic acid. Where the above acids are used a trace of a Lewis acid, such as aluminum chloride or boron trifluoride, is preferably employed to facilitate the esterification.

A solvent is generally utilized in this step to dissolve the diol and the acid, acid halide or acid anhydride used in esterifying the diol. Examples of suitable solvents for use herein include pyridine, collidine, lutidine, trimethylamine, and triethylamine. Pyridine is the preferred solvent. A solvent is not absolutely necessary; however, yields are decreased when a solvent is not used herein. The solvent is used herein in a weight ratio of solvent to diol of from about 1:1 to about 20:1, preferably from about 3:1 to about 10:1.

In Step (2), a reaction mixture comprising the hydrolyzed reaction product, 2-exo-3-endo-dimethyl-3-exo(4'-methyl-5'-hydroxypentyl)norborneol, esterifying agent, and, generally, a solvent is prepared. The reaction can be run in the atmosphere at ordinary room temperatures in from about 4 to about 24 hours. The temperature utilized is not critical providing extremely high temperatures which promote the formation of by-products or extremely low temperatures which decrease the rate of reaction are not utilized. In order to reduce the formation of by-products the reaction is preferably run in an oxygen-free atmosphere, e.g., nitrogen or argon. The time required for the reaction to reach completion can vary considerably since it is dependent upon a number of factors such as concentration of reactants, temperature of the reaction mixture, and amount of solvent utilized, but generally is from about 1 to about 24 hours.

The hydroxy ester of 2-exo-3-endo-dimethyl-3-exo(4'-methyl-5'-hydroxypentyl)norborneol can be recovered in relatively pure form in the following manner. The reaction product can be added to water or an aqueous solution of, for example, sodium chloride. The hydroxy ester is extracted with diethyl ether. Any solvent, e.g., pyridine, remaining with the ester can be removed by washing the ether solution of the ester with a dilute acid solution. The excess acid is removed with water or an aqueous solution of, for example, sodium bicarbonate or sodium chloride. The ether solution of the hydroxy ester is then dried by conventional means, for example, with anhydrous magnesium sulfate.

STEP (3)

The third step of this process comprises dehydrating the hydroxy ester of 2-exo-3-endo-dimethyl-3-exo(4'-methyl-5'-hydroxypentyl)norborneol obtained from Step (2) with thionyl chloride, phosphorous oxychloride or a Lewis acid to obtain the ester of dihydro-β-santalol having the formula

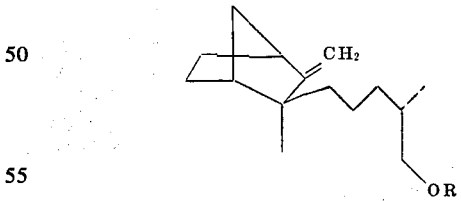

wherein R is as hereinbefore defined. These dehydrating agents are utilized herein in a molar ratio of dehydrating agents (thionyl chloride, phosphorous oxychloride or Lewis acid) to the hydroxy ester of 2-exo-3-endo-dimethyl-3-exo(4'-methyl-5'-hydroxypentyl)norborneol of from about 5:1 to about 25:1, preferably from about 10:1 to about 15:1.

Phosphorous oxychloride and thionyl chloride are preferred dehydrating agents for use in this invention. Any Lewis acid can be utilized in this step to convert the hydroxy ester of 2-exo-3-endo-dimethyl-3-exo(4'-methyl-5'-hydroxypentyl)-norborneol, i.e., the reaction product of Step (2), to the ester of dihydro-β-santalol. Among the Lewis acids suitable for use herein are aluminum chloride, boron trifluoride, stannic chloride, zinc chloride, ferric chloride, titanium tetrachloride, zinc bromide, magnesium bromide, and boron tribromide. Where a Lewis acid is used, boron trifluoride is particularly preferred.

A solvent is used in this step to dissolve the ester of Step (2) and the dehydrating agent, e.g., the thionyl chloride, the phosphorus oxychloride, or the Lewis acid.

Suitable solvents for use when phosphorous oxychloride or thionyl chloride is used as the dehydrating agent are pyridine, collidine, trimethylamine, and triethylamine. Pyridine is the preferred solvent for use herein. Methylene chloride can be used as a cosolvent in the above solvent systems but is not required. These solvents are used in a volume ratio of pyridine, collidine, trimethylamine or triethylamine to methylene chloride (when methylene chloride is used herein) of from about 1:1 to about 10:1, preferably from 3:1 to 7:1. The solvents are utilized with the esters of Step (2) in a weight ratio of solvent to ester of from about 5:1 to about 75:1, preferably from 25:1 to 35:1.

When the dehydrating agent is a Lewis acid the most generally used solvent is diethyl ether. Other solvents can be utilized herein; for example, aromatic solvents such as benzene and toluene or ether solvents such as tetrahydrofuran, 1,2-dimethoxyethane, bis-(2-methoxyethyl)ether and dioxane are suitable for this purpose.

In Step (3), a reaction mixture is prepared comprising the hydroxy ester of 2-exo-3-endo-dimethyl-3-exo(4'-methyl-5'-hydroxypentyl)norborneol and a portion of the solvents to be used. When thionyl chloride or phosphorus oxychloride are used herein the reaction mixture is cooled to from about −30° C. to about 15° C., preferably from −10° to 0° C. Higher reaction temperatures can be used; however, adverse side reactions may take place. It is also preferred that an inert atmosphere, e.g., nitrogen or argon, be maintained over the reaction mixture.

The thionyl chloride, phosphorous oxychloride and the rest of the solvent to be used is then added to the cooled reaction mixture over a period of from about 5 to about 30 minutes. It is preferred that the thionyl chloride be predissolved in a small amount of solvent and cooled to the temperature of the reaction mixture prior to its addition. The reaction mixture is stirred for about 5 to about 15 minutes. By diluting the reaction mixture with a hydrocarbon solvent such as pentane, hexane, heptane, or octane or after this reaction period, most of the ester of dihydro-β-santalol can be protected from further undesirable reactions by extraction into the organic layer.

In the preferred embodiment wherein thionyl chloride or phosphorous oxychloride is used as the dehydrating agent, the ester of dihydro-β-santalol can be obtained readily from the reaction mixture by adding the reaction mixture to water or ice. Preferably, the aqueous solution is saturated with, for example, sodium chloride, to prevent any loss of the ester through water solubility. The ester is extracted from the aqueous solution with a hydrocarbon solvent, e.g., pentane or hexane. The extracts are washed with a dilute acid solution to remove any remaining amine solvent; washed with water, preferably saturated with, for example, sodium chloride; and dried in any suitable manner, e.g., with anhydrous magnesium sulfate.

When a Lewis acid is utilized as the dehydrating agent, the reaction mixture is maintained at temperatures ranging from about 15° to about 100° C., preferably at the reflux temperature of the reaction mixture, for from about 1 to about 24 hours. The course of this reaction can be followed by vapor phase chromatography.

When Lewis acids are utilized herein, the ester of dihydro-β-santalol can be recovered in any suitable manner. In one method, a dilute solution of a base (e.g., NaOH, KOH, NaHCO$_3$, Na$_2$CO$_3$) is added to the reaction mixture to neutralize any acidic materials. Ether or other suitable solvents are then used to extract the ester of dihydro-β-santalol from the reaction mixture. The ether extracts are washed with saturated aqueous solutions of, for example, sodium chloride, and then dried in any convenient manner. The ether can be removed, for example, by distillation, to obtain the ester of dihydro-β-santalol.

STEP (4)

The fourth step of this process comprises saponifying the ester of dihydro-β-santalol with a "strong base" to obtain dihydro-β-santalol having the structural formula

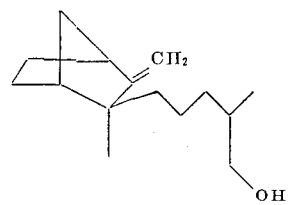

Any strong base can be utilized in this step of this process. For purposes of this invention, the strong bases which can be used are those which yield a solution pH of at least about 10.2 measured at 25° C. when they are dissolved in distilled water at the 1 weight percent level. It will be understood that the term, strong base, encompasses, for example, such basic compounds as alkali metal carbonates, alkali metal silicates, alkali metal and alkaline earth metal oxides and the like (which compounds do not actually contain hydroxyl anions, but which yield hydroxyl ions when they are dissolved in water), as well as, the alkali metal and alkaline earth metal hydroxides. Economic considerations generally dictate that inorganic strong bases, e.g., sodium and potassium hydroxide, be used herein.

A non-aqueous solvent system is also generally used in this step but this is not necessary. Among the many solvents which can be utilized herein, the short chain (C$_1$–C$_4$) alcohols are preferred. A solvent system comprised of water and short chain alcohols can also be used herein. It is also preferred that this step of this process be accomplished in an oxygen-free atmosphere, e.g., nitrogen or argon.

A reaction mixture is prepared comprising the ester of dihydro-β-santalol and a strong base and, generally, a solvent. The strong base is utilized in a weight ratio of solvent to ester of from about 3:1 to about 12:1, preferably from 6:1 to 8:1. The reaction is accomplished at from about 0° to 50°, preferably at room temperature in from about 12 to about 36 hours. The reaction time, of course, is influenced by the concentration of reactants, amount of solvent used, and the temperature at which the reaction is conducted.

Dihydro-β-santalol can be isolated from this reaction mixture by pouring the reaction mixture into water or saturated aqueous solutions; extracting the dihydro-β-santalol with, for example, ether; washing the ether extracts with water or saturated aqueous solutions e.g., sodium chloride solutions, and removing any remaining water with, for example, anhydrous magnesium sulfate. The ether can be removed by distillation leaving dihydro-β-santalol which can be further purified by distillation at reduced pressure.

Dihydro-β-santalol, prepared by the process of this invention, has a highly desirable and useful odor characterized as strong sandalwood. This compound can be used as a component of perfume compositions for ultimate use in products such as soaps, detergents, deodorants and the like. Perfume compositions containing odoriferously effective amounts, e.g., 0.001 to about 50 percent of dihydro-β-santalol, are desirable and useful. More specific illustrations of the perfume utility of this compound are found in Examples II to IV hereinafter.

EXAMPLES

The following examples illustrate specific preferred embodiments of this invention and are not intended to be limiting. All percentages and ratios in the following examples as well as in the specification and in the appended claims are by weight unless otherwise indicated. Temperatures are expressed in degrees centigrade. Boiling points are not corrected.

Data listed in all of the examples were obtained by means of the following techniques unless otherwise indicated. The apparatus described by Johnson et al., "β-Carbethoxy-γ, γ-Diphenylvinylacetic Acid," Organic Syntheses, 30, p. 18 (1959), was used to maintain a nitrogen atmosphere. Infrared spectra were determined on a Perkin-Elmer Model 137 Spectrophotometer; ultraviolet spectra were determined in ethanol on a Perkin-Elmer Model 202 Spectrophotometer. Nuclear magnetic resonance (n.m.r.) spectra were determined in carbon tetrachloride with a Varian Model HA–100 Spectrometer with chemical shifts measured relative to tetramethylsilane (10 $\tau$). The n.m.r. data are in the order chemical shift, integration, multiplicity, coupling constant (in Hz), and assignment. Gas-liquid chromatography (glpc) was accomplished with an Aerograph Model 202B using a flow rate of 100 ml./min. on 5-ft. by 0.25-in. columns packed with (A) 20 percent FFAP (Carbowax 20M terminated with nitroterephthalic acid) on 60/80 mesh Chromosorb P or (B) 20 percent SE 30 (a methyl silicone gum rubber compound) on 60/80 mesh Chromosorb W.

EXAMPLE I

Preparation of dihydro-$\beta$-santalol from 3-endomethyl-3-exo(4'-methyl-5'-hydroxypentyl)norcamphor A. Preparation of 3-endo-methyl-3-exo(4'-methyl-5'-hydroxypentyl)norcamphor The starting compound for this invention, 3-endo-methyl-3-exo(4'-methyl-5'-hydroxypentyl)norcamphor was prepared according to the process set forth in Example I of U.S. Pat. No. 3,579,479. In this process, 2-methyl-4-pentanol is borated with boric acid to from tri(2-methyl-4-pentenyl)borate. The borate is hydrobrominated by a free radical addition and then hydrolyzed to obtain 2-methyl-5-bromopentanol. The bromopentanol is borated with boric acid and, subsequently, this product is reacted with the enolate of 3-methylnorcamphor and then hydrolyzed to form 3-endo-methyl-3-exo(4'-methyl-5'-hydroxypentyl)norcamphor.

B. Preparation of 2-exo-3-endo-dimethyl-3-exo(4'-methyl-5'-hydroxypentyl)norborneol - Step (1)

A 100 ml. round bottom flask was dried and fitted with a Y adapter, septum, reflux condenser, and nitrogen inlet and was charged with 15 ml. of a 2.4 molar ethereal solution (36 millimoles) of methyllithium and 40 ml. of diethyl ether. A nitrogen atmosphere was introduced and 2.71 g. of 3-endo-methyl-3-exo(4'-methyl-5'-hydroxypentyl)norcamphor (12.1 millimoles) (prepared in Section A above) in 20 ml. of diethyl ether was then added to the flask. The reaction was exothermic and gently refluxed during the addition. The reaction mixture was subsequently stirred at room temperature for about 3 hours. The reaction product was then hydrolyzed by adding the reaction mixture to an aqueous mixture of water and ice and saturated with sodium chloride. The product was extracted with diethyl ether and the ether solution died with anhydrous magnesium sulfate. The ether was then removed by distillation. The remaining product was distilled and 2.60 g. (90 percent) of a viscous oil, b.p. 125°–145° C. at 0.1 mm. Hg, 2-exo-3-endo-dimethyl-3-exo(4'-methyl-5'-hydroxypentyl)norborneol was obtained. This material, purified by gas-liquid partition chromatography, exhibited $n_D^{26.5}$ 1.5019 $\lambda_{max}^{film}$ 2.97, 7.31, 8.87, 9.69, 10.51, 10.60, 11.04 $\mu$, n.m.r. signals at $\tau$ 6.50–6.85 (CH$_2$OH, 8.82 (HOCCH$_3$), 9.12 (doublet J = 6 Hz, CHCH$_3$), 9.16 (CH$_3$).

Results substantially similar to those achieved in the above reaction are obtained when the following organometallic compounds are substituted for methyllithium on an equimolar basis: methylmagnesium iodide, methylmagnesium chloride, methylmagnesium bromide, methylsodium and methylpotassium. Substantially equivalent results are also obtained when metallic sodium or sodium hydride is used in combination with the above organometallics.

Results substantially similar to those achieved in the above reaction are obtained when the following solvents are substituted for diethyl ether on an equal weight basis: tetrahydrofuran, dioxane, 1,2-methoxyethane and bis-(2-methoxyethyl ether).

C. Preparation of the Ester of 2-exo-3-endo-dimethyl-3-exo(4'-methyl-5'-hydroxypentyl)norborneol - Step (2)

A dry 25 ml. round bottom flask fitted with a Y adapter, septum, and nitrogen inlet was charged with a solution of 2.60 g. (11 millimoles) of 2-exo-3-endo-dimethyl-3-exo(4'-methyl-5'-hydroxypentyl)norborneol (prepared in Section B above) in 13 ml. of pyridine. A nitrogen atmosphere was introduced and 3.5 ml. of acetic anhydride was added to the flask. The resulting solution was stirred for 24 hours at room temperature. The reaction mixture was then added to an aqueous solution of sodium chloride and extracted with diethyl ether. The ether extract was washed with a sodium chloride solution, washed with a 5 percent hydrochloric acid solution and subsequently washed again with a sodium chloride solution. The solution was dried over anhydrous magnesium sulfate. The solvent was distilled off and 3.37 g. of light green oil was obtained. This oil was distilled to obtain 2.76 g. (89 percent) of the hydroxy acetate of 2-exo-3-endo-dimethyl-3-exo(4'-methyl-5'-hydroxypentyl)norborneol (b.p. 124°–5°, 0.05 mm. Hg) which was shown to be 70 percent pure by vapor phase chromatography. This material exhibited $\lambda_{max}^{film}$ 2.88, 5.72, 7.31, 8.05, 9.63 $\mu$, n.m.r. signals at $\tau$ 6.00–6.40 (CH$_2$OAc), 8.03 (OAc), 8.81 (HOCCH$_3$), 9.07 (doublet, J = 7 Hz, CHCH$_3$), 9.12 (CH$_3$).

Results substantially similar to those achieved above are obtained when the following compounds are substituted on an equivalent basis for acetic anhydride: acetyl bromide, acetyl chloride, propionyl bromide, propionyl chloride, valeryl bromide, butyryl chloride, propionic anhydride, acetic propionic anhydride, butanoic anhydride, and acetic butanoic anhydride. 2-exo-3-endo-dimethyl-3-exo(4'-methyl-5'-hydroxypentyl)norborneol can also be esterified by utilizing acetic acid, propionic acid or butanoic acid, plus a trace of any Lewis acid.

Substantially similar results are also obtained when the following solvents are substituted for pyridine on an equal weight basis: collidine, lutidine, trimethylamine and triethylamine.

D. Preparation of the ester of dihydro-$\beta$-santalol from the hydroxy ester of 2-exo-3-endo-dimethyl-3-exo(4'-methyl-5'-hydroxypentyl)norborneol - Step (3)

A dry 250 ml. round bottom flask was fitted with a side arm adapter and septum and charged under nitrogen with 2.60 g. of the hydroxy acetate of 2-exo-3-endo-dimethyl-3-exo(4'-methyl-5'-hydroxypentyl)norborneol (prepared in Section C above) dissolved in 50 ml. of pyridine and 10 ml. of methylene chloride. This solution was chilled (−8° to −10° C.) and a solution of thionyl chloride (10 ml.) dissolved in pyridine (10 ml.) was added to the cooled solution over a five minute period. The resulting solution was stirred at −10° C. for an additional 10 minutes at which time 50 ml. of pentane was added. This mixture was added to a mixture of water and ice saturated with sodium chloride and isolated with pentane. The pentane solution was sequentially washed with aqueous sodium chloride, 3 percent hydrochloric acid and two additional volumes of aqueous sodium chloride. The pentane solution was dried with anhydrous magnesium sulfate and the pentane was removed to obtain 2.40 g. (99 percent) of the acetate ester of dihydro-$\beta$-santalol. Distillation afforded 2.06 g. (77 percent) of a yellow oil having a boiling point of 120°–5° C. at 0.05 mm. Hg. Redistillation, b.p. 90° C. at 0.02 mm. Hg and subsequent glpc purification gave dihydro-$\beta$-santalol acetate: $n_D^{32}$ 1.4727, $\lambda_{max}^{film}$ 3.30, 5.72, 6.04, 7.32, 8.09, 9.65, 11.39 $\mu$, n.m.r. signals at $\tau$ 5.40, 5.63 (2H, C CH$_2$), 6.05–6.41 (2H, CH$_2$OAc), 7.41 (1H, C$_1$—H), 7.38 (1H, C$_4$—H), 8.09 (3H, OAc), 9.00 (CH$_3$), 9.12 (doublet, J = 6 Hz, CHCH$_3$).

Results substantially similar to those achieved in the above reaction are obtained when phosphorous oxychloride or the following Lewis acids are substituted for thionyl chloride: aluminum chloride, boron trifluoride, stannic chloride, zinc chloride, ferric chloride, titanium tetrachloride, zinc bromide, magnesium bromide, and boron tribromide.

Substantially similar results are also obtained when the following solvents are substituted for the mixture of pyridine and methylene chloride when thionyl chloride or phosphorous oxychloride are used as dehydrating agents: pyridine, collidine, trimethylamine and triethylamine and mixtures of these solvents with methylene chloride. When Lewis acids are used herein the following solvents are utilized in place of the mixture of pyridine and methylene chloride: benzene, toluene, tetrahydrofuran, 1,2-dimethoxyethane, bis-(2-methoxyethyl)ether, dioxane, benzene and toluene.

E. Preparation of dihydro-$\beta$-santalol from the acetate ester of dihydro-$\beta$-santalol - Step (4)

A dry 25 ml. round bottom flask was charged with 1.7 g. (6.4 millimoles) of the acetate ester of dihydro-β-santalol (prepared in Section D above), six pellets (1 g.) of potassium hydroxide and about 15 ml. of ethyl alcohol and then placed under a nitrogen atmosphere. The resulting solution was stirred at room temperature for 24 hours and then added to an aqueous solution of sodium chloride and extracted with diethyl ether. The extracts were washed with an aqueous solution of sodium chloride and dried over anhydrous magnesium sulfate. Removal of the ether solvent afforded 1.50 g. yield of crude dihydro-β-santalol (100 percent yield). Distillation of the crude dihydro-β-santalol resulted in 1.24 g. (87 percent) of dihydro-β-santalol, b.p. 110°–115° C. at 0.03 mm. Hg. The dihydro-β-santalol obtained was further purified by column chromatography (Florisil elution with 2 to 5 percent ether in hexane). This material exhibited $n_D^{20}$ 1.4920, $\lambda_{max.}^{film}$ 3.00, 3.29, 6.03, 7.31, 9.01, 9.65, 11.37 μ, n.m.r. signals at τ 5.32, 5.59 (2H, C CH$_2$), 5.89 (1H, OH), 6.50–6.90 (2H, CH$_2$OH), 7.38 (1H, C$_1$ —H), 7.94 (1H, C$_4$—H), 9.00 (CH$_3$), 9.13 (doublet, J = 7 Hz, CHCH$_3$).

Results substantially similar to the above are obtained when other strong bases are substituted for potassium hydroxide: sodium hydroxide, calcium hydroxide, magnesium hydroxide, sodium and potassium carbonate, sodium oxide, calcium oxide, and potassium oxide and sodium silicate.

Substantially similar results are also obtained when any various short chain alcohols are substituted for ethyl alcohol: e.g., methyl alcohol, propyl alcohol, and butyl alcohol.

EXAMPLE II

Perfume Compositions

Perfume compositions containing dihydro-β-santalol are prepared by mixing the components shown below in the amounts indicated. The compositions exhibit highly desirable and useful odors.

Composition A — Narcissus

| Component | Percent by Weight |
| --- | --- |
| Dihydro-β-santalol | 10.00 |
| Neroli oil | 4.00 |
| Vetivert oil | 12.50 |
| Isobutyl salicylate | 14.50 |
| Phenylacetic aldehyde | 5.00 |
| Paracresyl acetate | 20.00 |
| Ylang ylang | 8.50 |
| Heliotropin | 5.50 |
| Cinnamic alcohol | 20.00 |

Composition B — Chypre

| Component | Percent by Weight |
| --- | --- |
| Essence oakmoss | 5.00 |
| Bergamot oil | 22.50 |
| Vetivert oil | 7.50 |
| Oil of lavender | 5.00 |
| Dihydro-β-santalol | 7.00 |
| Patchouli | 1.00 |
| Clove bud oil | 3.50 |
| Jasmine complex | 10.00 |
| Rose complex | 8.00 |
| Isobutyl salicylate | 7.00 |
| Cinnamic alcohol | 5.00 |
| Heliotropin | 10.00 |
| Coumarin | 5.00 |
| Resin aroma of tonka bean | 2.00 |
| Methyl nonyl acetic aldehyde | 1.50 |

The components and proportions in the perfume compositions of this example can be adjusted according to methods well known in the perfume art to form a wide variety of desirable perfume compositions containing odoriferously effective amounts of these compounds.

EXAMPLE III

Soap Bar Composition

A conventional household soap bar having the following composition is prepared:

| Component | Percent by Weight |
| --- | --- |
| Sodium soap | 75.0 |
| Potassium soap | 7.5 |
| (The total soap comprises a mixture of 80% tallow soap and 20% coconut soap) | |
| Water | 15.0 |
| Perfume Composition A of Example II | 2.5 |
| TOTAL | 100.0 |

This soap bar exhibits a desirable narcissus fragrance. Composition B of Example II can be substituted for Composition A in the above soap bar composition to attain a chypre fragrance.

Example IV IV

Detergent Compositions

A conventional, granular, heavy-duty built detergent having the following composition is prepared:

| Component | Percent by Weight |
| --- | --- |
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume Composition A of Example II | 0.2 |
| TOTAL | 100.0 |

The detergent composition exhibits a desirable narcissus fragrance. Composition B of Example II can be substituted for Composition A to attain a highly desirable chypre fragrance.

What is claimed is:

1. A process for preparing dihydro-β-santalol from 3-endo-methyl-3-exo(4'-methyl-5'-hydroxypentyl)norcamphor comprising the steps of:

1. reacting 3-endo-methyl-3-exo(4'-methyl-5'-hydroxypentyl)norcamphor with a compound selected from the group consisting of sodium metal and sodium hydride in a molar ratio of sodium metal or sodium hydride to norcamphor compound of from about 0.9:1 to about 1:0.9 and subsequently, reacting the resulting sodium salt of 3-endo-methyl-3-exo(4'-methyl-5'-hydroxypentyl)norcamphor with an organometallic compound selected from the group consisting of methylmagnesium bromide, methylmagnesium iodide, methylmagnesium chloride, methyllithium, methylsodium and methylpotassium in a solvent selected from the group consisting of diethyl ether, dibutyl ether, tetrahydrofuran, dioxane, 1,2-dimethoxyethane and bis-(2-methoxyethyl)ether at a temperature of from about 40° to 100° C. for from about 1 to 24 hours with a methyl Grignard to norcamphor compound molar ratio of from about 2:1 to 6:1 or a methylmetallic compound to norcamphor compound molar ratio of from about 2:1 to 5:1 and a solvent to norcamphor compound ratio of from about 5:1 to 40:1 and subsequently, hydrolyzing to obtain 2-exo-3-endo-dimethyl-3-exo-(4'-methyl-5'-hydroxypentyl)norborneol;

2. esterifying 2-exo-3-endo-dimethyl-3-exo(4'-methyl-5'-hydroxypentyl)norborneol of Step (1) with an esterifying agent to obtain an alkanoyl ester of 2-exo-3-endo-dimethyl-3-exo(4'-methyl-5'-hydroxypentyl)norborneol wherein the alkanoyl group has from two to about eight carbon atoms;

3. dehydrating the ester of 2-exo-3-endo-dimethyl3-exo(4'-methyl-5'-hydroxypentyl)norborneol of Step (2) with a dehydrating agent selected from the group consisting of thionyl chloride, phosphorus oxychloride, and Lewis acids to obtain an ester of dihydro-β-santalol; and 4. saponifying the ester of dihydro-β-santalol with a strong base to obtain dihydro-β-santalol.

2. The process of claim 1 wherein, in Step (2), the esterifying agent is selected from the group consisting of acetyl bromide, acetyl chloride, propionyl bromide, propionyl chloride, valeryl bromide, butyryl chloride, propionic anhydride, acetic propionic anhydride, butanoic anhydride, acetic butanoic anhydride, acetic acid, propionic acid, butanoic acid and acetic anhydride.

3. The process of claim 2 wherein the esterifying agent is acetic anhydride.

4. The process of claim 1 wherein, in Step (2), the 2-exo-3-endo-dimethyl-3-exo(4'-methyl-5'-hydroxypentyl)norborneol and the esterifying agent are dissolved in a solvent selected from the group consisting of pyridine, collidine, lutidine, trimethylamine and triethylamine.

5. The process of claim 4 wherein, in Step (2), the esterifying agent is used in a molar ratio of esterifying agent to 2-exo-3-endo-dimethyl-3-exo(4'-methyl-5'-hydroxypentyl)norborneol of from about 1:1 to about 1:5 and wherein, in Step (2), the solvents of claim 4 are utilized in a weight ratio of solvent to 2-exo-3-endo-dimethyl-3-exo(4'-methyl-5'-hydroxypentyl)norborneol of from about 1:1 to about 20:1.

6. The process of claim 5 wherein, in Step (2), the reaction mixture is allowed to react for from about 1 to about 24 hours at a temperature of from about 15° to about 100° C. in an inert atmosphere.

7. The process of claim 1 wherein, in Step (3), a solvent is used in a weight ratio of solvent to the ester of 2-exo-3-endo-dimethyl-3-exo(4'-methyl-5'-hydroxypentyl)norborneol of from about 5:1 to about 75:1 and is selected from the group consisting of pyridine, collidine, trimethylamine and triethylamine and mixtures of methylene chloride with these solvents, in a volume ratio of about 1:1 to about 1:10.

8. The process of claim 9 wherein, in Step (3), the dehydrating agent is selected from the group consisting of thionyl chloride and phosphorus oxychloride and wherein said dehydrating agent is used in a molar ratio of dehydrating agent to the ester of 2-exo-3-endo-dimethyl-3-exo(4'-methyl-5'-hydroxypentyl)norborneol of from about 5:1 to about 25:1.

9. The process of claim 8 wherein, in Step (3), the reaction mixture is maintained at a temperature of from about −30° C. to about 15° C. for from about 5 to about 45 minutes in an inert atmosphere.

10. The process of claim 9 wherein, in Step (3), the dehydrating agent is a Lewis acid selected from the group consisting of aluminum chloride, boron trifluoride, stannic chloride, zinc chloride, ferric chloride, titanium tetrachloride, zinc bromide, magnesium bromide, and boron tribromide and wherein the Lewis acid is used in a molar ratio of Lewis acid to the ester of 2-exo-3-endo-dimethyl-3-exo(4'-methyl-5'-hydroxypentyl)norborneol of from about 0.25:1 to about 1:1.

11. The process of claim 1 wherein, in Step (4), a solvent is used in a weight ratio of solvent to the ester of dihydro-β-santalol of from about 3:1 to about 12:1.

12. The process of claim 11 wherein, in Step (4), the reaction mixture is maintained at a temperature of from about 0° to about 50° C. for from about 12 to about 36 hours in an inert atmosphere.

* * * * *

PO-1050
(5/69)

UNITED STATES PATENT OFFICE
CERTIFICATE OF CORRECTION

Patent No. 3,673,266        Dated  June 27, 1972

Inventor(s) Wayne I. Fanta & William F. Erman

It is certified that error appears in the above-identified patent and that said Letters Patent are hereby corrected as shown below:

Column 2, line 61, delete "OH".

Column 9, line 24, "from" should read --form--

Column 9, line 47, "died" should read --dried--

Column 11, line 2, "(6.4" should read --(6.5--

Column 11, line 18, "(2H,C CH$_2$)" should read --(2H,C=CH$_2$)--

Column 12, line 23, "Example IV IV" should read --Example IV--

Column 14, line 8, "Claim 9" should read --Claim 7--

Column 14, line 18, "Claim 9" should read --Claim 7--

Signed and sealed this 9th day of January 1973.

(SEAL)
Attest:

EDWARD M. FLETCHER, JR.
Attesting Officer

ROBERT GOTTSCHALK
Commissioner of Patents